(12) United States Patent
Lin et al.

(10) Patent No.: US 10,025,859 B2
(45) Date of Patent: Jul. 17, 2018

(54) METHOD AND SYSTEM FOR SECOND-DEGREE FRIEND QUERY

(71) Applicant: TENCENT TECHNOLOGY (SHENZHEN) COMPANY LIMITED, Shenzhen (CN)

(72) Inventors: Liao Lin, Shenzhen (CN); Yifeng Shi, Shenzhen (CN); Shushen Pan, Shenzhen (CN); Cong Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 513 days.

(21) Appl. No.: 14/736,410

(22) Filed: Jun. 11, 2015

(65) Prior Publication Data

US 2015/0278364 A1 Oct. 1, 2015

Related U.S. Application Data

(63) Continuation of application No. PCT/CN2013/086698, filed on Nov. 7, 2013.

(30) Foreign Application Priority Data

Dec. 11, 2012 (CN) .......................... 2012 1 0531942

(51) Int. Cl.
*G06F 17/30* (2006.01)
*G06Q 10/10* (2012.01)
*G06Q 50/00* (2012.01)

(52) U.S. Cl.
CPC .. *G06F 17/30864* (2013.01); *G06F 17/30867* (2013.01); *G06Q 10/10* (2013.01); *G06Q 50/01* (2013.01)

(58) Field of Classification Search
CPC ............... G06F 3/0481; G06F 21/6218; G06F 21/6263; G06F 17/30867;
(Continued)

(56) References Cited

U.S. PATENT DOCUMENTS 7,120,619 B2 * 10/2006 Drucker .............. G06F 17/3002
706/45
8,316,056 B2 * 11/2012 Wable ............... G06F 17/30867
707/791

(Continued)

FOREIGN PATENT DOCUMENTS

CN      101237426 A      8/2008
CN      101968818 A      2/2011

(Continued)

OTHER PUBLICATIONS

State Intellectual Property Office of the P.R.C (SIPO) Office Action 1 for 201210531942.3 dated Apr. 12, 2017 9 Pages.

(Continued)

*Primary Examiner* — Angelica Ruiz
(74) *Attorney, Agent, or Firm* — Anova Law Group, PLLC

(57) ABSTRACT

The present disclosure discloses a second-degree friend query method. The method includes storing a first-degree friend of each account, querying for the first-degree friend after receiving a second-degree friend query command, and query the first-degree friend to obtain a second-degree friend. A storage module stores the first-degree friend relationships. The second-degree friend is obtained through a query according to the first-degree friend in real time. The present disclosure further discloses a second-degree friend query apparatus and system corresponding to the foregoing method and a storage medium. The system includes a processing server and a storage server. The storage server stores a first-degree friend for each account, and queries for (Continued)

and returns the first-degree friend at the request of the processing server. The processing server controls an entire query procedure, and obtains a second-degree friend after twice queries. Further, because the processing server can manage multiple storage servers, obtaining a friend relationship chain of multiple types in one query command is supported.

16 Claims, 3 Drawing Sheets

(58) Field of Classification Search
CPC ....... G06F 2221/2115; G06F 15/17306; G06F 17/30595; G06F 2221/2101

USPC ........... 707/600–831, 899, 999.001–999.206
See application file for complete search history.

(56) References Cited

U.S. PATENT DOCUMENTS

| | | | |
|---|---|---|---|
| 2006/0230061 A1* | 10/2006 | Sample | G06Q 10/10 |
| 2010/0274815 A1* | 10/2010 | Vanasco | G06F 17/30867 707/798 |
| 2011/0137932 A1* | 6/2011 | Wable | G06F 17/30867 707/769 |
| 2012/0124150 A1* | 5/2012 | Ge | G06Q 30/02 709/206 |
| 2012/0158720 A1 | 6/2012 | Luan | |

FOREIGN PATENT DOCUMENTS

| | | |
|---|---|---|
| CN | 101976263 A | 2/2011 |
| CN | 102710556 A | 10/2012 |

OTHER PUBLICATIONS

The World Intellectual Property Organization (WIPO) International Search Report for PCT/CN2013/086698 dated Feb. 20, 2014.

* cited by examiner

METHOD AND SYSTEM FOR SECOND-DEGREE FRIEND QUERY

RELATED APPLICATION

This application by Tencent Technology (Shenzhen) Company Limited is a continuation of PCT Application No. PCT/CN2013/086698, entitled "SYSTEM, METHOD, AND APPARATUS FOR SECOND-DEGREE FRIEND QUERY," filed on Nov. 7, 2013. PCT Application No. PCT/CN2013/086698 claims priority to Chinese Patent Application No. 201210531942.3, filed with the Chinese Patent Office on Dec. 11, 2012 and entitled "SYSTEM, METHOD, AND APPARATUS FOR SECOND-DEGREE FRIEND QUERY." PCT Application No. PCT/CN2013/086698 and Chinese Patent Application No. 201210531942.3 are both incorporated herein by reference in the entirety.

FIELD OF THE TECHNOLOGY

The present disclosure relates to the field of network data query technologies, and in particular, to a system for second-degree friend querying and method and a storage medium.

BACKGROUND OF THE DISCLOSURE

In a social network, one user has many friends. Each friend of the user also has many friends. A friend of a friend may be a person that the user knows or expects to know. If the friend of the friend can be recommended to the user, it is conducive to establish a more perfect friend relationship for the user. Conventional friend relationship query services all provide services for querying for a direct friend, that is, a first-degree friend. When the friend of the friend, that is, a second-degree friend, needs to be searched for, a second-degree friend relationship may be calculated offline and stored in advance. During a query, the second-degree friend may be directly obtained from a pre-storage location. In this manner, however, the second-degree friend relationship often cannot be updated in time. In addition, storage of the second-degree friend relationship that is calculated offline may consume a large amount of machine resources.

SUMMARY

Based on the foregoing situation, embodiments of the present invention put forward a system for second-degree friend querying and method and a storage medium, to obtain a latest second-degree friend, additionally reducing occupation of machine resources.

One aspect of the present disclosure provides a system for second-degree friend querying. The system includes a processing server and a storage server. The storage server is configured to store first-degree friends of all accounts. After receiving a first-degree friend query request about a current account from the processing server, query for a first-degree friend of the current account among the stored first-degree friends of all accounts and return the first-degree friend of the current account. After receiving a first-degree friend query request about each returned first-degree friend of the current account from the processing server, query for a first-degree friend of each first-degree friend of the current account among the stored first-degree friends of all accounts and return the first-degree friend of each first-degree friend of the current account.

The processing server is configured to send the first-degree friend query request about the current account to the storage server after receiving a second-degree friend query command about the current account. After receiving the first-degree friend of the current account returned from the storage server, send the first-degree friend query request about each returned first-degree friend of the current account to the storage server. Receive a second-degree friend of the current account from the storage server.

Further, the first-degree friend of the first-degree friend of the current account is the second-degree friend of the current account.

Another aspect of the present disclosure provides a method for querying second-degree friends. The method includes pre-storing first-degree friends of all accounts; receiving a second-degree friend query command about a current account; and querying for a first-degree friend of the current account among the pre-stored first-degree friends of all accounts according to the command. Further, the method includes returning the first-degree friend of the current account; and querying in real time for a first-degree friend of each first-degree friend of the current account among the pre-stored first-degree friends of all accounts to obtain a second-degree friend of the current account, wherein the first-degree friend of the first-degree friend of the current account is the second-degree friend of the current account.

Another aspect of the present disclosure provides one or more storage mediums that comprise a computer executable instruction, the computer executable instruction being used to execute the method for second-degree friend querying as described in the present disclosure.

For a system for second-degree friend querying, method, and apparatus in embodiments of the present invention, a first-degree friend is first queried for, and then the first-degree friend is routed again, to obtain a second-degree friend. Only a first-degree friend relationship of each account needs to be stored, and therefore occupation of machine resources is greatly reduced; and the second-degree friend is obtained through a query according to the first-degree friend, and therefore the method is highly real-time compared with an offline calculation method.

DESCRIPTION OF EMBODIMENTS

The following describes solutions in the present disclosure in detail with reference to accompanying drawings and embodiments. Embodiments of a system for second-degree friend querying of the present disclosure are described first.

Embodiment 1

Figure 1:
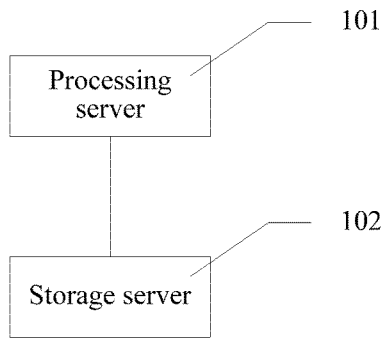
FIG. 1 is a schematic structural diagram of embodiment 1 of a system for second-degree friend querying according to the present disclosure.

As shown in FIG. 1, a system for second-degree friend querying in this embodiment includes a processing server 101 and a storage server 102. The storage server 102 stores first-degree friends of all accounts. After receiving a second-degree friend query command about a current account sent by a client, the processing server 101 sends a first-degree friend query request about the current account to the storage server 102. The storage server 102 queries for a first-degree friend of the current account among the stored first-degree friends of all accounts and returns the first-degree friend of the current account. The processing server 101 sends a first-degree friend query request about each returned first-degree friend of the current account to the storage server 102. The storage server 102 queries for a first-degree friend of each first-degree friend of the current account among the stored first-degree friends of all accounts and returns the first-degree friend of each first-degree friend of the current account. The first-degree friend of the first-degree friend of the current account is a second-degree friend of the current account. Therefore, the processing server 101 obtains the second-degree friend of the current account.

It can be known from the above description that, in this embodiment, the storage server 102 pre-stores the first-degree friends of all accounts. When receiving a first-degree friend query request for querying about an account from the processing server 101, the storage server 102 performs a query among the stored first-degree friends of all accounts and returns a result. The processing server 101 finds, by using the storage server 102, the first-degree friend of the account sent by the client. The processing server 101 uses the found first-degree friend as a to-be-queried-for account, and queries for a first-degree friend of the to-be-queried-for account by using the storage server 102. All first-degree friends of all first-degree friends of the account that is sent by the client are second-degree friends of the account.

For example, if the processing server 102 receives a second-degree friend query command for querying about an account A, the processing server 102 sends a first-degree friend query request for querying about the account A to the storage server 102. The storage server 102 queries for a first-degree friend of the account A among the pre-stored first-degree friends of all accounts, to obtain accounts A1, A2 . . . and An as the first-degree friends, and sends a result to the processing server 101. After receiving the result, the processing server 101 sends a first-degree friend query request for querying about the accounts A1, A2, . . . , and An, to the storage server 102. The storage server 102 separately queries for first-degree friends of the accounts A1, A2 . . . and An, among the pre-stored first-degree friends of all accounts. For example, first-degree friends of the account A1 are A11, A12, . . ., and A1m, first-degree friends of the account A2 are A21, A22, . . . , and A2p, and first-degree friends of the account An are An1, An2, . . . , and Anq. The storage server 102 sends query results to the processing server 101. The processing server 101 obtains the second-degree friends of the account A: A11, A12 . . . , and A1m, A21, A22 . . . , and A2p, and An1, An2 . . . , and Anq.

In this embodiment, a storage server 102 stores and queries for a first-degree friend. A processing server 101 controls twice queries to be performed, so as to obtain a second-degree friend. The storage server 102 needs to store only the first-degree friend, and therefore resources consumed by second-degree friend offline calculation and second-degree friend storage are saved. Real-time updating of friend information is also facilitated. Further, the obtained second-degree friend is also the most recent data.

Embodiment 2

Figure 2:
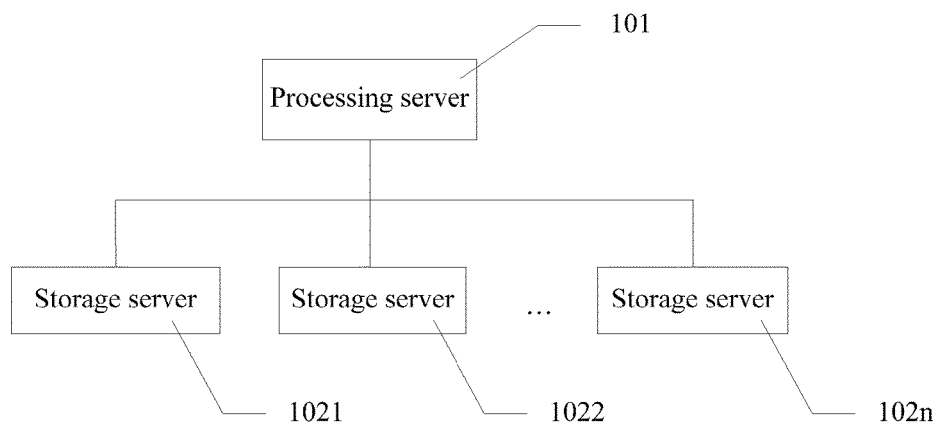
FIG. 2 is a schematic structural diagram of embodiment 2 of a system for second-degree friend querying according to the present disclosure.

If resources for accounts that need to be stored are limited, there may be only one storage server. If there are too many accounts, and a friend relationship is complex, there may be multiple storage servers. As shown in FIG. 2, this embodiment includes 1 processing server 101 and n storage servers (a storage server 1021, a storage server 1022, . . . , and a storage server 102n). One storage server stores first-degree friends of some accounts, for example, first-degree friends of accounts whose ending number is 0, another storage server stores first-degree friends of some other accounts, and so on.

Based on the foregoing storage manner, the processing server 101 in this embodiment needs to perform node management on the storage servers. The processing server 101 records a link between a storage server and an account. A specific representation form of the link may be an index or a list. After a client sends a second-degree friend query command about a current account, the processing server 101 finds a storage server corresponding to the current account from the link, and sends a first-degree friend query request about the current account to the storage server. Or, the processing server 101 sends, only to a storage server, a first-degree friend query request about an account distributed on the storage server. After the storage server returns a first-degree friend, the processing server 101 queries the foregoing link, to identify a storage server corresponding to each first-degree friend. The processing server 101 then sends a first-degree friend query request about the first-degree friend to the storage server. After finding a first-degree friend of the first-degree friend of the current account, the storage server returns the first-degree friend of the first-degree friend of the current account to the processing server 101. The first-degree friend of the first-degree friend of the current account is a second-degree friend of the current account. Therefore, the processing server 101 collects results returned by the storage servers, to obtain the second-degree friend of the account sent by the client.

In this embodiment, multiple storage servers are used to share responsibilities for storage and query of friends. A link between an account and a storage server on which the account is located is established. This embodiment is capable of reducing query pressure of a single storage server, decreasing a size of a network packet between a storage server and the processing server, and increasing query efficiency.

Embodiment 3

Nowadays, types of online communities (for example, QQ, microblog, and space) are growing. One user generally registers with various communities. For convenience of management, a unified account is generally used to associate respectively information about the same user in the communities. At the same time, the user may have a specific friend in each community. The user's friends in different communities may be the same or different. In this embodiment, to better identify the first-degree friend and the second-degree friend, consideration about the communities is added.

A system for second-degree friend querying in this embodiment includes 1 processing server 101 and n storage servers (a storage server 1021, a storage server 1022 . . . and a storage server 102n). The storage servers separately store first-degree friends of some accounts in some communities, and the some accounts and the some communities may be of any combination.

Based on the foregoing storage manner, the processing server 101 in this embodiment performs node management on the storage servers. If a client needs to know second-degree friends of an account in all communities, the processing server 101 may record only a link between an account and a storage server, and send requests to all storage servers on which a first-degree friend of a current account and a first-degree friend of the first-degree friend of the current account are stored (no matter in which community). If the client needs to know a second-degree friend of an account in a specific community, the link recorded by the processing server 101 should further include the community. That is, links between the account, the community, and the storage server are recorded. After receiving a query command of the client, by searching the link, the processing server 101 sends a request only to a storage server on which the first-degree friend of and the first-degree friend of the first-degree friend of the current account in the specific community are stored. It may be that communities are not differentiated when the first-degree friend is queried for, and a query is only performed in the specific community when the first-degree friend of the first-degree friend of the current account is queried for.

For example, a QQ number of a user is used to perform various types of association on information of the user in communities such as QQ, microblog, and space. The storage server 1021 stores a first-degree friend of a QQ number whose ending number is 0 in QQ. The storage server 1022 stores a first-degree friend of a QQ number whose ending number is 0 in microblog. The storage server 1023 stores all first-degree friends of a QQ number whose ending number is 1 in QQ and microblog. The storage server 1024 stores all first-degree friends of a QQ number whose ending number is 3 in QQ, microblog, and space, and so on. If the client needs to know second-degree friends of a to-be-queried-for QQ number in all communities, the processing server 101 records a link between a storage server and a QQ number. After receiving a second-degree friend query command about a QQ number, the processing server 101 determines, by using the link, all storage servers on which a first-degree friend of the QQ number is stored, no matter which community the first-degree friend is in.

For example, the processing server 101 receives a second-degree friend query command about a QQ number whose ending number is 0. The processing server 101 determines, by searching the link, that storage servers on which a first-degree friend of the QQ number whose ending number is 0 include 1021 and 1022. The processing server 101 sends a first-degree friend query request to the two servers. After receiving the request, the storage server 1021 queries for a first-degree friend of the QQ number in QQ, and returns the first-degree friend to the processing server 101. The storage server 1022 queries for a first-degree friend of the QQ number in microblog, and returns the first-degree friend to the processing server 101. The processing server 101 collects the first-degree friends in the two communities. The processing server 101 uses the first-degree friends separately as to-be-queried-for accounts, and continues to query for the first-degree friend of the first-degree friend of the current account in the foregoing manner. The first-degree friend of the first-degree friend of the current account is a second-degree friend of the current account. Therefore, second-degree friends of the account in various communities that is sent by the client are finally obtained.

A storage server in this embodiment stores first-degree friends of an account in various communities. A processing server may record links between an account, a community, and a storage server. Therefore when a second-degree friend is queried for, first-degree friends and second-degree friends in the various communities may be found, increasing the number of found friends. Further, a community in which a friend is located may be specified, thereby obtaining a second-degree friend that is more clearly located.

Embodiment 4

A system for second-degree friend querying in this embodiment includes 1 processing server 101 and n storage servers: a storage server 1021, a storage server 1022 . . . and a storage server 102n. The storage servers separately store first-degree friends of some accounts in some communities, and the some accounts and the some communities may be in any combination.

Based on the foregoing storage manner, the processing server 101 in this embodiment performs node management on the storage servers. If a client needs to know second-degree friends of an account in all communities, the processing server 101 may record only a link between an account and a storage server, and send requests to all storage servers on which a first-degree friend of a current account and a first-degree friend of the first-degree friend of the current account are stored (no matter in which community). If the client needs to know a second-degree friend of an account in a specific community, the link recorded by the processing server 101 should further include the community, that is, links between the account, the community, and the storage server are recorded. After receiving a query command of the client, by searching the link, the processing server 101 sends a request only to a storage server on which the first-degree friend of the current account and the first-degree friend of the first-degree friend of the current account in the specific community are stored. It may be that communities are not differentiated when the first-degree friend is queried for. A query is only performed in the specific community when the first-degree friend of the first-degree friend of the current account is queried for. The first-degree friend of the first-degree friend of the current account is a second-degree friend of the current account.

To respond to the query command of the client, in this embodiment, the processing server 101 further returns the obtained first-degree friend and/or second-degree friend of the current account in various communities or the specific community to the client. Upon the returning, a community in which a first-degree friend or a second-degree friend is located may further be indicated.

To make the client aware of a potential friend, in this embodiment, a common friend is further recommended to the client. The common friend refers to a common friend between the current account and the first-degree friend of the current account.

A method for the processing server 101 to determine a common friend may include comparing the first-degree friend of the current account with the first-degree friend of the first-degree friend of the current account that are returned by the storage server. If there is an overlapping account between all first-degree friends of the current account and all first-degree friends of one first-degree friend thereof, the overlapping account is a common friend between the current account and the one first-degree friend thereof. The processing server 101 may determine all common friends between the current account and each first-degree friend of the current account, and present/recommend the common friends together to the client.

The second-degree friend that is finally identified, the first-degree friend that is identified, and the foregoing common friend are all presented/recommended to the client. This helps the client know the status of various friends, and further make a choice.

The following describes embodiments of a second-degree friend query method.

Embodiment 1

Figure 3:
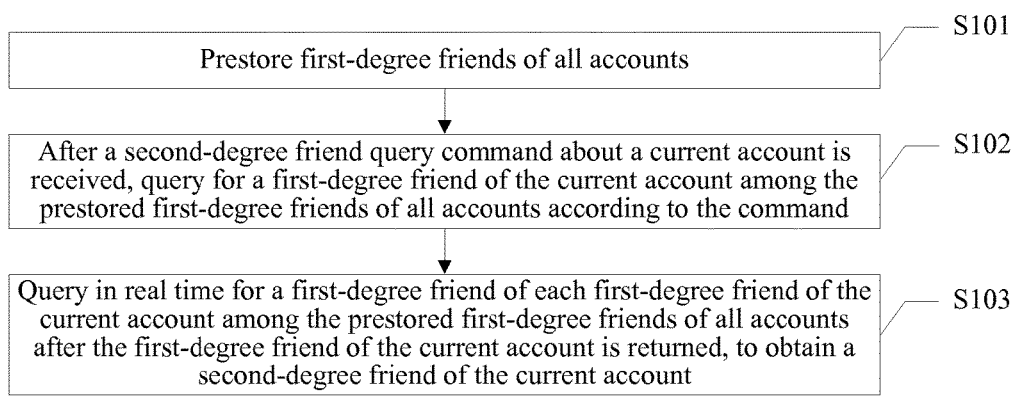
FIG. 3 is a schematic flowchart of embodiment 1 of a second-degree friend query method according to the present disclosure.

A second-degree friend query method in this embodiment is shown in FIG. 3, including the following steps.

Step S101: Pre-store first-degree friends of all accounts.

Step S102: After a second-degree friend query command about a current account is received, query for a first-degree friend of the current account among the pre-stored first-degree friends of all accounts according to the command.

Step S103: Query in real time for a first-degree friend of each first-degree friend of the current account among the pre-stored first-degree friends of all accounts after the first-degree friend of the current account is returned, to obtain a second-degree friend of the current account.

It can be known from the above description that, in this embodiment, the first-degree friends of all accounts are pre-stored. After a client sends a second-degree friend query command about an account, a first-degree friend of the account is found in a pre-stored first-degree friend relationship. The found first-degree friend is used as a to-be-queried-for account, and a first-degree friend of the to-be-queried-for account is further queried for in the pre-stored first-degree friends. The first-degree friend of the first-degree friend of the current account is the second-degree friend of the current account, and therefore a second-degree friend of the account that the client queries for is finally obtained.

For example, after a second-degree friend query command for querying about an account A is received, a first-degree friend of the account A is queried for in the pre-stored first-degree friends of all accounts, to obtain accounts A1, A2 . . . and An as first-degree friends. First-degree friends of the accounts A1, A2 . . . and An are separately queried for among the pre-stored first-degree friends of all accounts. For example, first-degree friends of the account A1 are A11, A12, . . . , and A1m, first-degree friends of the account A2 are A21, A22, . . . , and A2p, and first-degree friends of the account An are An1, An2, . . ., and Anq, and then second-degree friends of the account A are A11, A12, . . . , and A1m, A21, A22, . . . , and A2p, and An1, An2, . . . , and Anq.

The double queries (twice) in this embodiment are both performed against data of pre-stored first-degree friends. The pre-stored first-degree friends can be updated in real time, and therefore an obtained second-degree friend is the based on the most current data. In addition, when a solution in this embodiment is used, the second-degree friend does not need to be additionally calculated offline and stored, saving computing resources. To store friend information for a relationship chain one hundred million users, for example, over 40 storage server machines may be needed when a conventional technology is used. Fewer than 10% of the 40 machine resources are needed when the solution in this embodiment is employed.

Embodiment 2

Figure 4:
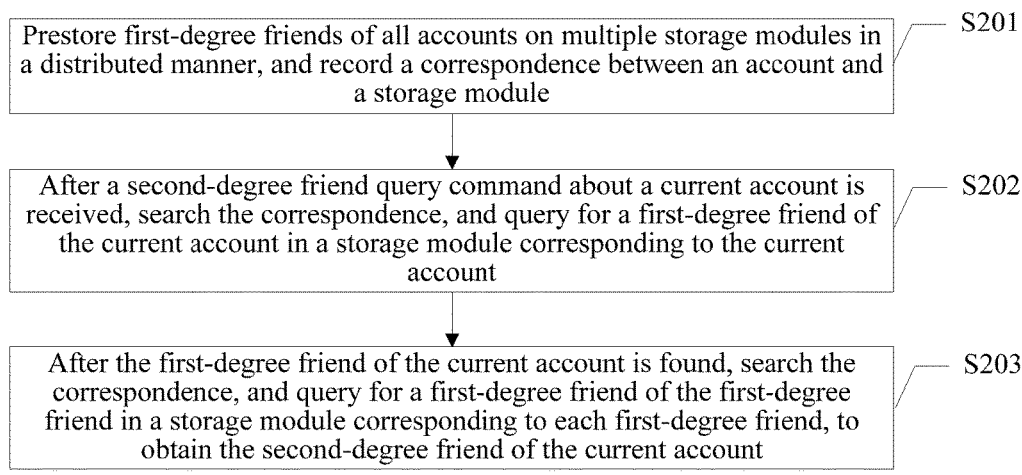
FIG. 4 is a schematic flowchart of embodiment 2 of a second-degree friend query method according to the present disclosure.

A second-degree friend query method in this embodiment is shown in FIG. 4, including the following steps.

Step S201: Pre-store first-degree friends of all accounts in multiple storage modules in a distributed manner. Record and store a link between an account and a storage module.

Step S202: After a second-degree friend query command about a current account is received, search the link, and query for a first-degree friend of the current account in a storage module corresponding to the current account.

Step S203: After the first-degree friend of the current account is found, search the link, and query for a first-degree friend of the first-degree friend in a storage module corresponding to each first-degree friend, where the first-degree friend of the first-degree friend of the current account is a second-degree friend of the current account, and therefore the second-degree friend of the current account is obtained.

It can be known from the above description that, in this embodiment, the first-degree friends of all accounts are pre-stored, and are stored in different storage modules. Therefore, the link between an account and a storage module need to be recorded and stored. Before a query, the storage module corresponding to the current account is determined by using the link, and the first-degree friend of the current account is queried in the storage module. After the first-degree friend is found, a storage module corresponding to each first-degree friend is determined by using the link, and a first-degree friend of each first-degree friend is separately searched for in the determined storage modules, to obtain the second-degree friend of the current account.

In this embodiment, multiple storage modules are used to share responsibilities for storage tasks, and a link between an account and a storage server on which the account is stored is established. Therefore, when a first-degree friend of a current account and a first-degree friend of the first-degree friend of the current account are queried for, the query may be accordingly performed in a corresponding storage module, which improves query efficiency.

Embodiment 3

Figure 5:
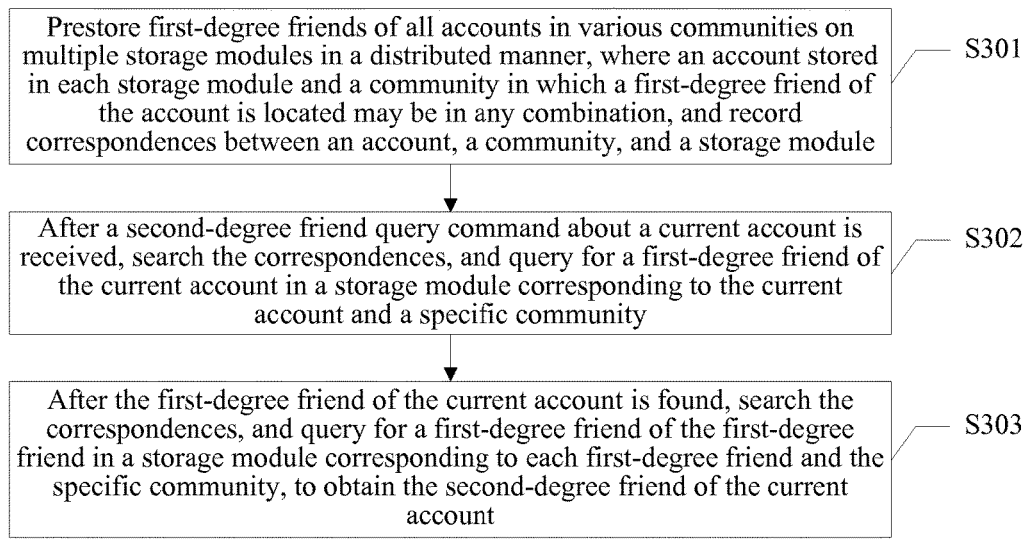
FIG. 5 is a schematic flowchart of embodiment 3 of a second-degree friend query method according to the present disclosure.

A second-degree friend query method in this embodiment is shown in FIG. 5, including the following steps.

Step S301: The storage module pre-stores first-degree friends of all accounts in various communities in multiple storage modules in a distributed manner. An account stored on each storage module and a community in which a first-degree friend of the account is located may be in any combination. The processing module may record links between an account, a community, and a storage module.

Step S302: After a second-degree friend query command about a current account is received, the processing module searches the links, and queries for a first-degree friend of the current account in a storage module corresponding to the current account and a specific community.

Step S303: After the first-degree friend of the current account is found, the processing module searches the links, and query for a first-degree friend of the first-degree friend in a storage module corresponding to each first-degree friend and the specific community. The first-degree friend of the first-degree friend of the current account is a second-degree friend of the current account, and therefore the second-degree friend of the current account is obtained.

Nowadays, the types of online communities (for example, QQ, microblog, and space) are growing, and one user generally registers with various communities. For convenience of management, a unified account is generally used to associate respectively information about the same user in the communities. At the same time, the user may have a specific friend in each community, and friends in different communities may be the same or may be different. In this embodiment, to better identify the first-degree friend and the second-degree friend, consideration about the communities is added.

In step S301, the accounts, the communities, and the storage modules may be in any combination, and first-degree friends of a same account in the various communities may be stored in a same storage module or different storage modules. If a client needs to know second-degree friends of an account in all communities, in step S301, only a link between an account and a storage module may be recorded. A first-degree friend of a current account and a first-degree friend of the first-degree friend of the current account may be queried for in all storage modules on which the first-degree friend of the current account and the first-degree friend of the first-degree friend of the current account are stored (no matter in which community); and if the client needs to know a second-degree friend of an account in a specific community, the links recorded in step S301 should further include the community, that is, links between the account, the community, and the storage module are recorded and stored. In step S302, after a query command of the client is received, by searching the links, a first-degree friend, that is, a first-degree friend of the first-degree friend, is queried for in a storage module on which the first-degree friend of the current account and the first-degree friend of the first-degree friend of the current account in the specific community are stored. Or, it may be that communities are not differentiated when the first-degree friend is queried for, and a query is only performed in the specific community when the first-degree friend of the first-degree friend of the current account is queried for. The first-degree friend of the first-degree friend of the current account is a second-degree friend of the current account.

For example, a QQ number of a user is used to perform association on information of the user in communities such as QQ, microblog, and space. The storage module 1021 stores a first-degree friend of a QQ number whose ending number is 0 in QQ. The storage module 1022 stores a first-degree friend of a QQ number whose ending number is 0 in microblog (that is, a friend being listened to). The storage module 1023 stores all first-degree friends of a QQ number whose ending number is 1 in QQ and microblog. The storage module 1024 stores all first-degree friends of a QQ number whose ending number is 3 in QQ, microblog, and space, and so on. If the client needs to know second-degree friends of a to-be-queried-for QQ number in all communities, a link between a storage module and a QQ number is recorded. After a second-degree friend query command about a QQ number is received, all storage modules on which a first-degree friend of the QQ number is stored are identified by using the link, no matter which community the first-degree friend is in. For example, a processing module may receive a second-degree friend query command about a QQ number whose ending number is 0. The processing module may then search the link to determine that storage modules on which a first-degree friend of the QQ number with ending number 0 include 1021 and 1022. The processing module may then perform searches in the two modules.

A storage module in this embodiment stores first-degree friends of an account in various communities Links between an account, a community, and a storage server are queried for, and a search is performed in a corresponding storage module. Therefore when a second-degree friend is queried for, first-degree friends and second-degree friends in the various communities may be found, increasing the number of found friends. Further, a community in which a friend is located may be specified. The processing module may then obtain a second-degree friend that is more clearly identified.

Embodiment 4

Figure 6:
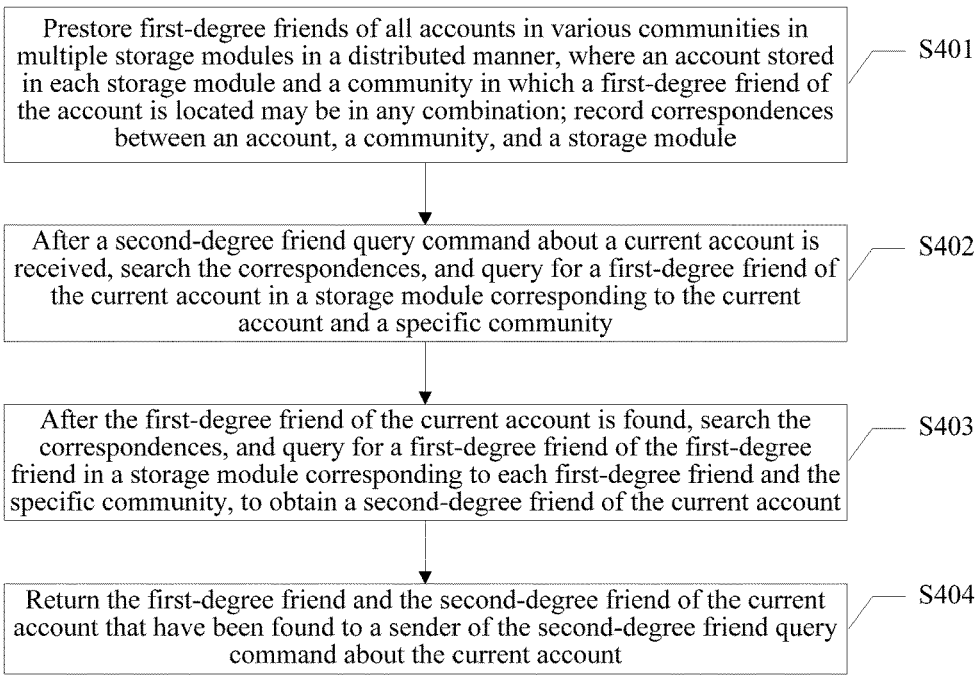
FIG. 6 is a schematic flowchart of embodiment 4 of a second-degree friend query method according to the present disclosure.

A second-degree friend query method in this embodiment is shown in FIG. 6, including the following steps.

Step S401: First-degree friends of all accounts in various communities are stored in multiple storage modules in a distributed manner. An account stored on each storage module and a community in which a first-degree friend of the account is located may be in any combination. The processing module records and stores links between an account, a community, and a storage module.

Step S402: After a second-degree friend query command about a current account is received, the processing module searches the links, and queries for a first-degree friend of the current account in a storage module corresponding to the current account and a specific community.

Step S403: After the first-degree friend of the current account is found, the processing module searches the links, and queries for a first-degree friend of the first-degree friend in a storage module corresponding to each first-degree friend and the specific community to obtain a second-degree friend of the current account. The first-degree friend of the first-degree friend of the current account is the second-degree friend of the current account.

Step S404: The storage module returns the first-degree friend and the second-degree friend of the current account that have been found to a sender of the second-degree friend query command about the current account.

As described in step S404, in this embodiment, the final second-degree friend and the first-degree friend that is found in the intermediate step are returned to the sender of the query command, (a client).

Further, in this embodiment, the first-degree friend may further be compared with the second-degree friend to obtain a common friend, and the common friend is also recommended to the client. A specific process of the comparison is that: all first-degree friends of a certain first-degree friend of the current account are compared with other first-degree friends of the current account. If a same account is found, the account is used as a common friend between the current account and the foregoing certain first-degree friend. In this way, it is convenient for a user to find more friends.

The present disclosure further provides embodiments of a second-degree friend query apparatus, and the following describes the embodiments of the second-degree friend query apparatus in the present disclosure.

Embodiment 1

Figure 7:
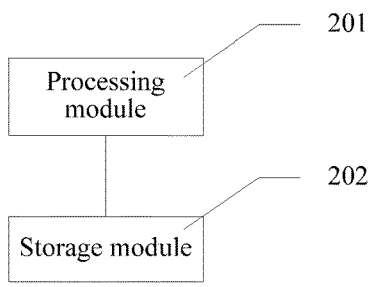
FIG. 7 is a schematic structural diagram of embodiment 1 of a second-degree friend query apparatus according to the present disclosure.

As shown in FIG. 7, a second-degree friend query apparatus in this embodiment includes a processing module 201 and a storage module 202. The storage module 202 stores first-degree friends of all accounts. After receiving a second-degree friend query command about a current account sent by a client, the processing module 201 sends a first-degree friend query request about the current account to the storage module 202. The storage module 202 queries for a first-degree friend of the current account among the stored first-degree friends of all accounts and returns the first-degree friend of the current account. The processing module 201 sends a first-degree friend query request about each returned first-degree friend of the current account to the storage module 202. The storage module 202 queries for a first-degree friend of each first-degree friend of the current account among the stored first-degree friends of all accounts and returns first-degree friend of each first-degree friend of the current account. The first-degree friend of the first-degree friend of the current account is a second-degree friend of the current account. Therefore, the processing module 201 obtains the second-degree friend of the current account.

It can be known from the above description that, in this embodiment, the storage module 202 pre-stores the first-degree friends of all accounts. When receiving a first-degree friend query request for querying about an account from the processing module 201, the storage module 202 performs a query among the stored first-degree friends of all accounts and returns a result. The processing module 201 finds, by using the storage module 202, a first-degree friend of the current account sent by the client, uses the found first-degree friend as a to-be-queried-for account, and queries for a first-degree friend of the to-be-queried-for account by using the storage module 202. All first-degree friends of all first-degree friends of the account that is sent by the client are second-degree friends of the current account.

For example, if the processing module 201 receives a second-degree friend query command for querying about an account A, the processing module 201 sends a first-degree friend query request for querying about the account A to the storage module 202. The storage module 202 queries for a first-degree friend of the account A among the pre-stored first-degree friends of all accounts, to obtain accounts A1, A2 . . . and An as the first-degree friends, and sends the result to the processing module 201. After receiving the result, the processing module 201 sends a first-degree friend query request for querying about A1, A2, . . . , and An to the storage module 202, and the storage module 202 separately queries for first-degree friends of the accounts A1, A2, . . . , and An, among the pre-stored first-degree friends of all accounts. For example, first-degree friends of the account A1 are A11, A12, . . . , and A1m, first-degree friends of the account A2 are A21, A22, . . . , and A2p, and first-degree friends of the account An are An1, An2, . . . , and Anq. The storage module 202 sends query results to the processing module 201. The processing module 201 obtains the second-degree friends of the account A: A11, A12 . . . , and A1m, A21, A22 . . . , and A2p, and An1, An2 . . . , and Anq.

In this embodiment, a storage module 202 stores and queries for a first-degree friend, and a processing module 201 controls twice queries to be performed to obtain a second-degree friend. The storage module 202 needs to store only the first-degree friend. Therefore resources consumed by second-degree friend offline calculation and second-degree friend storage are saved, real-time updating is also facilitated, and the obtained second-degree friend is also based on the latest data.

Embodiment 2

Figure 8:
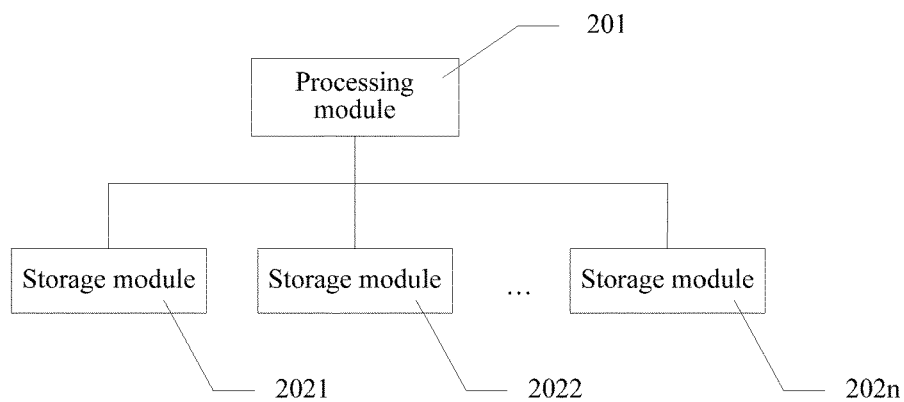
FIG. 8 is a schematic structural diagram of embodiment 2 of a second-degree friend query apparatus according to the present disclosure.

If resources of accounts that need to be stored are limited, there may be only one storage module. If there are many accounts are too many, and a friend relationship is complex, there may be multiple storage modules. As shown in FIG. 8, this embodiment includes 1 processing module 201 and n storage modules (a storage module 2021, a storage module 2022 . . . and a storage module 202n). One storage module stores first-degree friends of some accounts, for example, first-degree friends of accounts whose ending number is 0, another storage module stores first-degree friends of some other accounts, and so on.

Based on the foregoing storage manner, the processing module 201 in this embodiment needs to perform node management on the storage modules. The processing module 201 records a link between a storage module and an account. A specific representation form of the link may be an index or a list. After a client sends a second-degree friend query command about a current account, the processing module 201 finds a storage module corresponding to the current account from the link, and sends a first-degree friend query request about the current account to the storage module. Or, the processing module 201 sends, to a storage module, only a first-degree friend query request about an account distributed on the storage module. After the storage module returns a first-degree friend, the processing module 201 queries the foregoing link, to obtain a storage module corresponding to each first-degree friend, and sends a first-degree friend query request about the first-degree friend to the storage module. After finding a first-degree friend of the first-degree friend of the current account, the storage module returns the first-degree friend of the first-degree friend of the current account to the processing module 201. The processing module 201 collects results returned by the storage modules, where the first-degree friend of the first-degree friend of the current account is a second-degree friend of the current account, and then identifies the second-degree friend of the account sent by the client.

In this embodiment, multiple storage modules are used to share responsibilities for storage and query work. A link between an account and a storage module on which the account is identified. This embodiment is thus capable of reducing query pressure of a single storage module, decreasing a size of a network packet between a storage module and the processing module, and increasing query efficiency.

Embodiment 3

Nowadays, types of communities (for example, QQ, microblog, and space) are growing, and one user generally registers with various communities. For convenience of management, a unified account is generally used to associate respectively information about the same user in the communities. At the same time, the user has one or more friends in each community, and friends in different communities may be the same or different. In this embodiment, to better identify the first-degree friend and the second-degree friend, consideration about the communities is added.

As shown in FIG. 8, a second-degree friend query apparatus in this embodiment includes 1 processing module 201 and n storage modules (a storage module 2021, a storage module 2022 . . . and a storage module 202n). The storage modules separately store first-degree friends of some accounts in some communities, and the some accounts and the some communities may be in any combination.

Based on the foregoing storage manner, the processing module 201 in this embodiment performs node management on the storage modules. If a client needs to know second-degree friends of an account in all communities, the processing module 201 may record/store only a link between an account and a storage module, and send requests to all storage modules on which a first-degree friend of a current account and a first-degree friend of the first-degree friend of the current account are stored (no matter in which community). If the client needs to know a second-degree friend of an account in a specific community, the link recorded by the processing module 201 should further include the community. That is, links between the account, the community, and the storage module are recorded. After receiving a query command of the client, by searching the link, the processing module 201 sends a request only to a storage module on which the first-degree friend of the current account and the first-degree friend of the first-degree friend of the current account in the specific community are stored. If communities are not differentiated when the first-degree friend is queried for, a query may only be performed in the specific community when the first-degree friend of the first-degree friend is queried for. The first-degree friend of the first-degree friend of the current account is a second-degree friend of the current account.

For example, a QQ number of a user is used to perform association on information of the user in communities such as QQ, microblog, and space. The storage module 2021 stores a first-degree friend of a QQ number whose ending number is 0 in QQ. The storage module 2022 stores a first-degree friend of a QQ number whose ending number is 0 in microblog (a friend being listened to). The storage module 2023 stores all first-degree friends of a QQ number whose ending number is 1 in QQ and microblog. The storage module 2024 stores all first-degree friends of a QQ number whose ending number is 3 in QQ, microblog, and space, and so on. If the client needs to know second-degree friends of a to-be-queried-for QQ number in all communities, the processing module 201 records a link between a storage module and a QQ number. After receiving a second-degree friend query command about a QQ number, the processing module 201 determines, by using the link, all storage modules on which a first-degree friend of the QQ number is stored, no matter which community the first-degree friend is in. For example, the processing module 201 receives a second-degree friend query command about a QQ number whose ending number is 0, and then the processing module 201 determines, by searching the link, that storage modules on which a first-degree friend of the QQ number whose ending number is 0 include 2021 and 2022, and then sends a first-degree friend query request to the two modules. After receiving the request, the storage module 2021 queries for a first-degree friend of the QQ number in QQ, and returns the first-degree friend to the processing module 201. The storage module 2022 queries for a first-degree friend of the QQ number in microblog, and returns the first-degree friend to the processing module 201. The processing module 201 collects the first-degree friends in the two communities, and uses the first-degree friends separately as to-be-queried-for accounts, and queries for the first-degree friend of the first-degree friend in the foregoing manner. Second-degree friends of the account in various communities that is sent by the client are then obtained.

A storage module in this embodiment stores first-degree friends of an account in various communities, and a processing module may record links between an account, a community, and a storage module; and therefore when a second-degree friend is queried for, first-degree friends and second-degree friends of the current account in the various communities may be identified, increasing a quantity of identified friends, and a community in which a friend is located may be specified, thereby obtaining a second-degree friend that is more clearly located.

Embodiment 4

As shown in FIG. 8, a second-degree friend query apparatus in this embodiment includes 1 processing module 201 and n storage modules (a storage module 2021, a storage module 2022, . . . , and a storage module 202n). The storage modules separately store first-degree friends of some accounts in some communities, and the some accounts and the some communities may be in any combination.

Based on the foregoing storage manner, the processing module 201 in this embodiment performs node management on the storage modules. If a client needs to know second-degree friends of an account in all communities, the processing module 201 may record only a link between an account and a storage module, and send requests to all storage modules on which a first-degree friend of a current account and a first-degree friend of the first-degree friend of the current account are stored (no matter in which community). If the client needs to know a second-degree friend of an account in a specific community, the link recorded and stored by the processing module 201 should further include the community, that is, links between the account, the community, and the storage module are recorded and stored. After receiving a query command of the client, by searching the link, the processing module 201 sends a request only to a storage module on which the first-degree friend of the current account and the first-degree friend of the first-degree friend of the current account in the specific community are stored. Or it may be that communities are not differentiated when the first-degree friend is queried for, a query may only be performed in the specific community when the first-degree friend of the first-degree friend is queried for. The first-degree friend of the first-degree friend of the current account is a second-degree friend of the current account.

To respond to the query command of the client, in this embodiment, the processing module 201 further returns the obtained first-degree friend and/or second-degree friend of the current account in various communities or the specific community to the client. Upon returning data, a community in which a first-degree friend or a second-degree friend is located may further be indicated.

To make the client know a potential friend, in this embodiment, a common friend is further recommended to the client. The common friend refers to a common friend between the current account and a first-degree friend of the current account.

A method for the processing module 201 to determine a common friend may include comparing the first-degree friend of the current account with the first-degree friend of the first-degree friend of the current account that are returned by the storage module. If there is an overlapping account between all first-degree friends of the current account and all first-degree friends of one first-degree friend thereof, the overlapping account is a common friend between the current account and the one first-degree friend thereof. The processing module 201 may determine all common friends between the current account and each first-degree friend of the current account, and recommend the common friends together to the client.

The second-degree friend that is identified, the first-degree friend that is identified in the intermediate step, and the foregoing common friend are all recommended to the client, which helps the client know status of various friends, and further make a choice.

Embodiments of the present invention further provide one or more storage mediums that include a computer executable instruction. The computer executable instruction is used to execute a second-degree friend query method. The method includes the following steps: pre-storing first-degree friends of all accounts; receiving a second-degree friend query command about a current account, and querying for a first-degree friend of the current account among the pre-stored first-degree friends of all accounts according to the command; and querying in real time for a first-degree friend of each first-degree friend of the current account among the pre-stored first-degree friends of all accounts after the first-degree friend of the current account is returned, to obtain a second-degree friend of the current account. The first-degree friend of the first-degree friend of the current account is the second-degree friend of the current account.

The foregoing embodiments only describe several implementation manners of the present disclosure, and their description is specific and detailed, but cannot therefore be understood as a limitation on the patent scope of the present disclosure. It should be pointed out that, a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A system for second-degree friend querying in an online social network, comprising a processing server and multiple storage servers, wherein:
    each of the multiple storage servers is configured to:
        store first-degree friends of a plurality of accounts according to a link rule between the multiple storage servers and all accounts, wherein the link rule is configured to determine, based on an account number of an account, one of the multiple storage servers as the storage server that stores first-degree friends of the account;
        after receiving a first-degree friend query request about a current account from the processing server, query for a first-degree friend of the current account among the stored first-degree friends of the plurality of accounts and return the first-degree friend of the current account; and
        after receiving a first-degree friend query request about a returned first-degree friend of the current account from the processing server, query for a first-degree friend of the first-degree friend of the current account among the stored first-degree friends of the plurality of accounts and return the first-degree friend of the first-degree friend of the current account;
    the processing server is configured to:
        record the link rule between the multiple storage servers and the all accounts;
        after receiving a second-degree friend query command about the current account, identify a first storage server among the multiple storage servers that corresponds to the current account based on the link rule and an account number of the current account; and send the first-degree friend query request about the current account to the first storage server;
        after receiving the first-degree friend of the current account returned from the first storage server, identify a second storage server among the multiple storage servers that corresponds to the first-degree friend of the current account based on the link rule and an account number of the first-degree friend of the current account; and send the first-degree friend query request about each returned first-degree friend of the current account to the corresponding second storage server; and
        receive a second-degree friend of the current account from the corresponding second storage server; and
    the first-degree friend of the first-degree friend of the current account is the second-degree friend of the current account;
    the multiple storage servers store only first-degree friends of all accounts in a distributed manner, and do not store any second-degree friend of an account such that resources consumed by second-degree friend offline calculation and second-degree friend storage are saved.

2. The second-degree friend query system according to claim 1, wherein the first-degree friends stored on a storage server are first-degree friends of a number of accounts in one of multiple online communities, and the multiple storage servers are configured to comprehensively query for the current account the first-degree friend of the first-degree friend of the current account in a specified community of the multiple online communities.

3. The second-degree friend query system according to claim 2, wherein the second-degree friend query command about the current account received by the processing server comprises information about querying in the specified community of the multiple online communities.

4. The second-degree friend query system according to claim 3, wherein to the processing server instructs the first storage server corresponding to the current account to query for a first-degree friend of the current account in the specified community, and instructs the second storage server corresponding to the first-degree friend of the current account to query for a first-degree friend of the first-degree friend of the current account in the specified community.

5. The second-degree friend query system according to claim 1, wherein the processing server is further configured to identify a common friend among first-degree friends of the current account and second-degree friends of the current account.

6. The second-degree friend query system according to claim 5, wherein the processing server is further configured to return the first-degree friends and the second-degree friends of the current account that have been identified as a common friend to a sender of the second-degree friend query command.

7. The second-degree friend query system according to claim 1, wherein:
    the link rule is further configured to determine, based on the account number of the account and an online community associated with the account, one of the multiple storage servers as the storage server that stores first-degree friends of the account in the online community.

8. The second-degree friend query system according to claim 7, wherein:
    the account is associated with multiple online communities, the multiple online communities including a first online community and a second online community; and
    the link rule is configured to determine a storage server for storing first-degree friends of the account in the first online community, and determine another storage server for storing first-degree friends of the account in the second online community.

9. The second-degree friend query system according to claim 1, wherein:
    a representation form of the link rule is an index or a list.

10. The second-degree friend query system according to claim 1, wherein:
    the link rule is configured to determine, based on an ending number of the account number of the account, one of the multiple storage servers as the storage server that stores the first-degree friends of the account.

11. A method for querying second-degree friends in an online social network, comprising:
    pre-storing, by multiple storage servers, first-degree friends of all accounts, each of the multiple storage servers storing first-degree friends of a plurality of accounts according to a link rule between the multiple storage servers and all accounts, wherein the link rule is configured to determine, based on an account number of an account, one of the multiple storage servers as the storage server that stores first-degree friends of the account;

recording, by a processing server, the link rule between the multiple storage servers and the all accounts;

receiving a second-degree friend query command about a current account;

identifying, by the processing server, a first storage server among the multiple storage servers that corresponds to the current account based on the link rule and an account number of the current account;

querying, by the first storage server, for a first-degree friend of the current account among the pre-stored first-degree friends of the plurality of accounts according to the command;

returning the first-degree friend of the current account to the processing server;

identifying, a second storage server among the multiple storage servers that corresponds to the first-degree friend of the current account based on the link rule and an account number of the first-degree friend of the current account;

sending, by the processing server, the first-degree friend query request about each returned first-degree friend of the current account to the corresponding second storage server; and querying, by the corresponding second storage server, in real time for a first-degree friend of each first-degree friend of the current account among the pre-stored first-degree friends of all accounts to obtain a second-degree friend of the current account, wherein the first-degree friend of the first-degree friend of the current account is the second-degree friend of the current account.

12. The method for second-degree friend querying according to claim 11, wherein in the step of pre-storing first-degree friends of all accounts, the pre-stored first-degree friends are first-degree friends of all accounts in one or more online communities.

13. The method for second-degree friend querying according to claim 1, wherein the second-degree friend query command of the current account comprises information about querying in a specified community of the one or more online communities; and querying in real time for a first-degree friend of each first-degree friend of the current account is done in the specified community.

14. The method for second-degree friend querying according to claim 11, further comprising:
comparing the first-degree friend of the current account with the second-degree friend of the current account to obtain a common friend of the current account and the first-degree friend of the current account.

15. The method for second-degree friend querying according to claim 11, further comprising:

returning the first-degree friend and the second-degree friend of the current account that have been found and the common friend to a sender of the second-degree friend query command.

16. One or more storage mediums that comprise a computer executable instruction, the computer executable instruction being used to execute a method for second-degree friend querying in an online social network, and the method comprising:

pre-storing, by multiple storage servers, first-degree friends of all accounts, each of the multiple storage servers storing first-degree friends of a plurality of accounts according to a link rule between the multiple storage servers and all accounts, wherein the link rule is configured to determine, based on an account number of an account, one of the multiple storage servers as the storage server that stores first-degree friends of the account;

recording, by a processing server, the link rule between the multiple storage servers and the all accounts;

receiving a second-degree friend query command about a current account;

identifying, by the processing server, a first storage server among the multiple storage servers that corresponds to the current account based on the link rule and an account number of the current account;

querying, by the first storage server, for a first-degree friend of the current account among the pre-stored first-degree friends of the plurality of accounts according to the command;

returning the first-degree friend of the current account to the processing server;

identifying, a second storage server among the multiple storage servers that corresponds to the first-degree friend of the current account based on the link rule and an account number of the first-degree friend of the current account;

sending, by the processing server, the first-degree friend query request about each returned first-degree friend of the current account to the corresponding second storage server; and querying, by the corresponding second storage server, in real time for a first-degree friend of each first-degree friend of the current account among the pre-stored first-degree friends of all accounts to obtain a second-degree friend of the current account, wherein the first-degree friend of the first-degree friend of the current account is the second-degree friend of the current account.

* * * * *